(12) United States Patent
Seneci et al.

(10) Patent No.: US 12,514,664 B2
(45) Date of Patent: Jan. 6, 2026

(54) ACTUATION SYSTEM FOR TUBES OF A ROBOTIC TOOL

(71) Applicant: King's College London, London (GB)

(72) Inventors: Carlo Seneci, London (GB); Christos Bergeles, London (GB); Lyndon Da Cruz, London (GB)

(73) Assignee: King's College London, London (GB)

( * ) Notice: Subject to any disclaimer, the term of this patent is extended or adjusted under 35 U.S.C. 154(b) by 712 days.

(21) Appl. No.: 17/794,344

(22) PCT Filed: Jan. 22, 2021

(86) PCT No.: PCT/GB2021/050138
§ 371 (c)(1),
(2) Date: Jul. 21, 2022

(87) PCT Pub. No.: WO2021/148797
PCT Pub. Date: Jul. 29, 2021

(65) Prior Publication Data
US 2023/0051916 A1 Feb. 16, 2023

(30) Foreign Application Priority Data
Jan. 23, 2020 (GB) ..................... 2000992

(51) Int. Cl.
*A61B 34/30* (2016.01)
*A61B 34/00* (2016.01)
*B25J 9/10* (2006.01)

(52) U.S. Cl.
CPC .............. *A61B 34/71* (2016.02); *A61B 34/30* (2016.02); *B25J 9/102* (2013.01); *B25J 9/1075* (2013.01)

(58) Field of Classification Search
CPC ......... A61B 34/00; A61B 34/30; A61B 34/71; B25J 9/10; B25J 9/1075; B25J 9/102
See application file for complete search history.

(56) References Cited

U.S. PATENT DOCUMENTS

| | | | |
|---|---|---|---|
| 2007/0060879 A1 | 3/2007 | Weitzner et al. | |
| 2008/0300592 A1* | 12/2008 | Weitzner ............ | A61M 25/0113 606/41 |
| 2013/0172713 A1 | 7/2013 | Kirschenman | |
| 2015/0202009 A1* | 7/2015 | Nussbaumer .......... | A61B 46/10 128/856 |
| 2015/0265355 A1 | 9/2015 | Prestel et al. | |
| 2017/0112577 A1* | 4/2017 | Bonutti ..................... | G06T 7/20 |
| 2019/0125465 A1 | 5/2019 | Evans et al. | |

FOREIGN PATENT DOCUMENTS

| | | |
|---|---|---|
| CN | 107280767 | 10/2017 |
| WO | WO2011123699 | 10/2011 |
| WO | WO2015088655 | 6/2015 |
| WO | WO2018217430 | 11/2018 |
| WO | WO2019191413 | 10/2019 |

OTHER PUBLICATIONS

The International Search Report/Written Opinion dated July 5, 202, issued by the European Patent Office as International Search Authority for corresponding International Patent Application No. PCT/GB2021/050138; 19 pages.

* cited by examiner

*Primary Examiner* — Vi X Nguyen
(74) *Attorney, Agent, or Firm* — Smith Gambrell & Russell LLP (57) ABSTRACT

An actuation system for actuating concentric tubes of a concentric-tube robot. The actuation system is configured to actuate the concentric tubes from radially to one side of the concentric tubes.

13 Claims, 11 Drawing Sheets

ACTUATION SYSTEM FOR TUBES OF A ROBOTIC TOOL

The invention relates to an actuation system for actuating concentric tubes of a concentric-tube robot, a tendon-driven robot or a hybrid of a concentric-tube robot and a tendon-driven robot, as well as to a robot comprising the actuation system, a tool comprising tubes of a robot and a method of operating a robot.

BACKGROUND

Concentric-tube robots (CTRs) can be used for performing surgical procedures. The CTR has telescopic tubes that are concentric and can rotate and translate reciprocally. Motion is transmitted between the robotic actuators and the surgical instrument. Sterility is a requirement of the surgical environment.

US 2017/0143436 A1 discloses a modular sterilisable robotic system for endonasal surgery. Robotic tool cassettes, each including a concentric-tube manipulator, are configured to interchangeably connect with mounting structures of the surgical robot system. The tool cassettes are sterilisable. However, there is no sterile access to the inner channel of the robotic instrument that could be used for, for example, suction or irrigation in surgical applications.

It is an aim of the present disclosure to provide an actuation system which meets the sterility requirements of the surgical environment.

BRIEF SUMMARY

According to a first aspect there is provided an actuation system for actuating at least one tube of a concentric-tube robot, a tendon-driven robot or a hybrid of a concentric-tube robot and a tendon-driven robot, wherein the actuation system is configured to actuate the at least one tube from radially to one side of the at least one tube.

According to a second aspect there is provided a robot that is a concentric-tube robot, a tendon-driven robot or a hybrid of a concentric-tube robot and a tendon-driven robot comprising: the actuation system; and a tool comprising the at least one tube.

According to a third aspect there is provided a tool comprising at least one tube of a concentric-tube robot, a tendon-driven robot or a hybrid of a concentric-tube robot and a tendon-driven robot, wherein at least one of the tubes comprises a bevel gear around its circumference.

According to a fourth aspect there is provided a method of operating a concentric-tube robot, a tendon-driven robot or a hybrid of a concentric-tube robot and a tendon-driven robot, the method comprising: actuating at least one tube of the robot from radially to one side of the at least one tube.

BRIEF DESCRIPTION OF THE DRAWINGS

Embodiments will now be described by way of example only, with reference to the Figures, in which.

DETAILED DESCRIPTION

Figure 1:
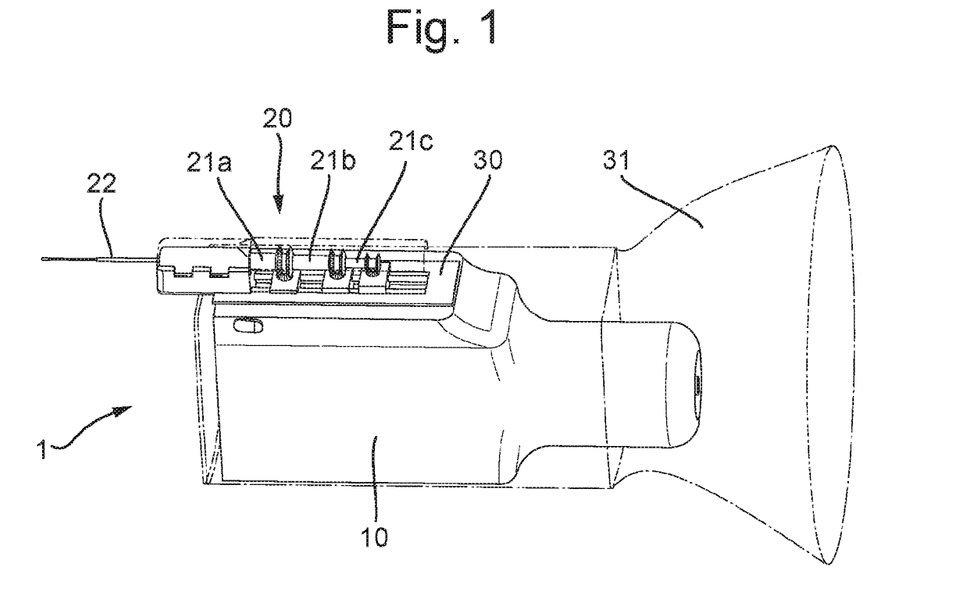
FIG. 1 schematically shows an actuation system according to an embodiment of the invention.
Figure 5:
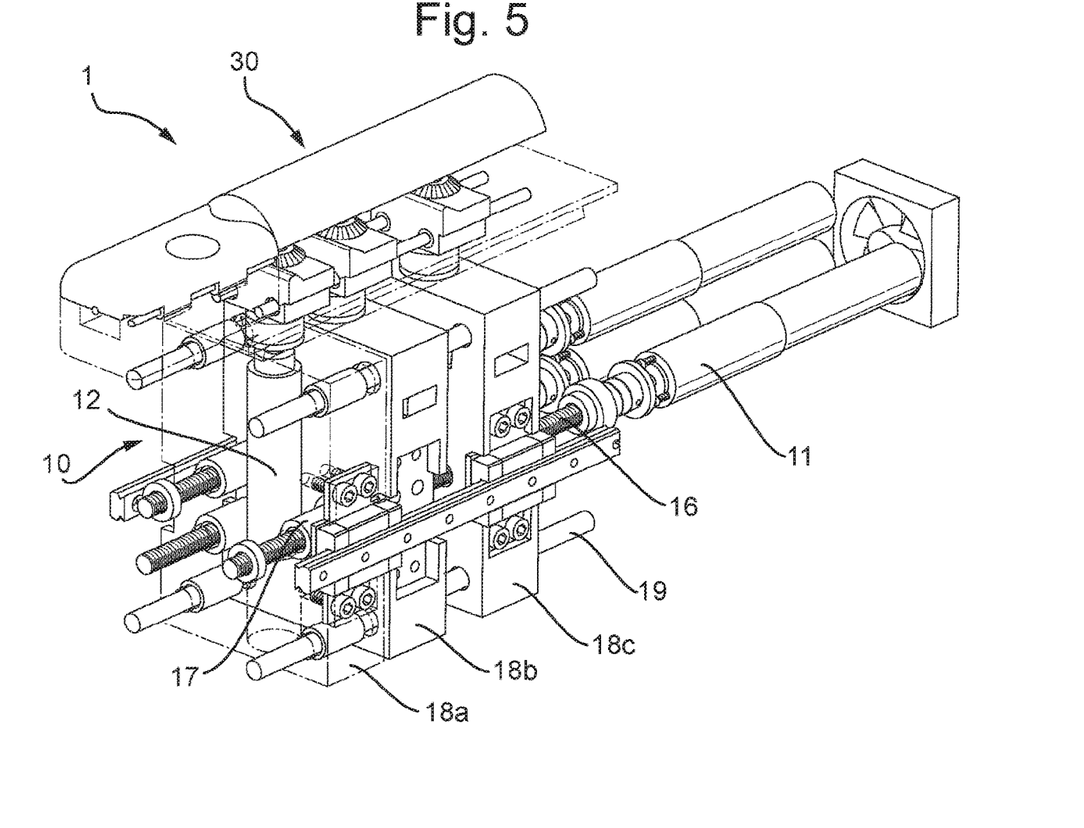
FIG. 5 is an internal view of an actuation system according to an embodiment of the invention.

FIG. 1 schematically shows an actuation system 1 according to an embodiment of the invention. The actuation system 1 is for actuating a tool 20, comprising at least one tube 21, of a robot such as a concentric-tube robot (CTR). As shown in FIG. 1, the actuation system 1 comprises an actuation unit 10. The main purpose of the actuation unit 10 is to carry all the motors and electronics needed to run the robot. As shown in FIG. 5 and explained in further detail below, the actuation unit 10 comprises actuation mechanisms 11, 12. Optionally, the actuation unit 10 is reusable. Typically, the actuation unit 10 is not sterilised. Typically, the actuation unit 10 is cleaned with wipes or cloths, for example.

As shown in FIG. 1, optionally the actuation system 1 comprises a drape sleeve 31. The drape sleeve 31 is configured to cover the actuation unit 10. The actuation unit 10 can be inserted into the drape sleeve 31. The drape sleeve 31 can help to allow the actuation unit 10 to be used in a sterile surgical environment.

As shown in FIG. 1, the actuation system 1 comprises a plate interface 30. The plate interface 30 allows motion to be transmitted between the non-sterile actuation unit 10 and a sterile tool 20 of the robot. The plate interface 30 is configured to separate the non-sterile actuation unit 10 from the sterile instrument.

Optionally, the plate interface 30 is attachable to and detachable from the actuation unit 10. For example, the plate interface 30 may be mounted once per surgical operation.

The invention will be described below in the context of an example in which the tool 20 comprises a plurality of concentric tubes 21, although it will be understood that the tool 20 may comprise only one tube 21. As shown in FIG. 1, optionally the plate interface 30 is for supporting the concentric tubes 21 such that the concentric tubes 21 can be removed from and replaced on the plate interface 30. Multiple tools 20 (i.e. sterile instruments) can be exchanged during the same surgical operation. Optionally, the tools 20 are disposable.

As shown in FIG. 1, optionally the actuation system 1 is configured to actuate the concentric tubes 21 from radially to one side of the concentric tubes 21. For example, as shown in FIG. 1, the concentric tubes 21 of the tool 20 may be mounted on the top of the actuation system 1. The concentric tubes 21 define an axial direction. The actuation unit 10 that comprises the motors is radially beside (below in the orientation shown in FIG. 1) the concentric tubes 21. This arrangement is different from prior art systems in which the actuation unit is typically positioned directly behind the concentric tubes 21. The actuation unit in the prior art systems is typically in the same axis as the axis defined by the concentric tubes.

By providing that the concentric tubes 21 are actuated from radially to one side of the concentric tubes 21, the position directly behind the concentric tubes 21 can remain sterile. This keeps the tip 22 of the tool 20 in the sterile environment. This also allows sterile access to the inner channel 61 (see, for example, FIG. 14) of the robotic tool 20 (i.e. inside the tubes 21). Such sterile access is described in further detail below and with reference to FIG. 14. In contrast, prior art systems have their access to the inner channel blocked by the actuation unit which is not sterilisable.

In FIG. 1, the tool 20 is shown positioned on top of the actuation unit 10. However, the orientation between the CTR 20 and the actuation unit 10 is not particularly limited. For example, the tool 20 may alternatively be positioned to one side of the actuation unit 10. In a further alternative, the tool 20 may be positioned below the actuation unit 10. The actuation unit 10 is not positioned behind the concentric tubes 21 along the axis defined by the concentric tubes 21.

As shown in FIG. 1, the tool 20 comprises a tip 22. The tip 22 may comprise an end effector 23 (see, for example, FIG. 10). The end effector 23 may be a surgical instrument for performing a surgical operation (or part of a surgical operation). The tip 22 may be connected to the inner concentric tube 21c. The movement of the tip 22 is controlled by controlling the rotation of the concentric tubes 21 and the axial translation of the concentric tubes 21 relative to each other. Optionally, the tool 20 comprises a plurality of concentric tubes 21. For example, the tool 20 may comprise three tubes 21. Alternatively the tool 20 may comprise four or more tubes 21. The concentric tubes 21 may comprise an inner tube 21c, an intermediate tube 21b and an outer tube 21a. As a further alternative, the tool 20 may comprise only one tube 21.

The actuation mechanisms 11, 12 of the actuation unit 10 are configured to control the movement of the tip 22 by controlling the rotational and translational movements of the concentric tubes 21 of the tool 20.

As shown in FIG. 1, the area directly behind the concentric tubes 21 is on the opposite side of the drape sleeve 31 from the actuation unit 10. Hence, this region may be part of the sterile surgical environment. The region directly behind the concentric tubes 21 is separated from the actuation unit 10.

Figure 2:
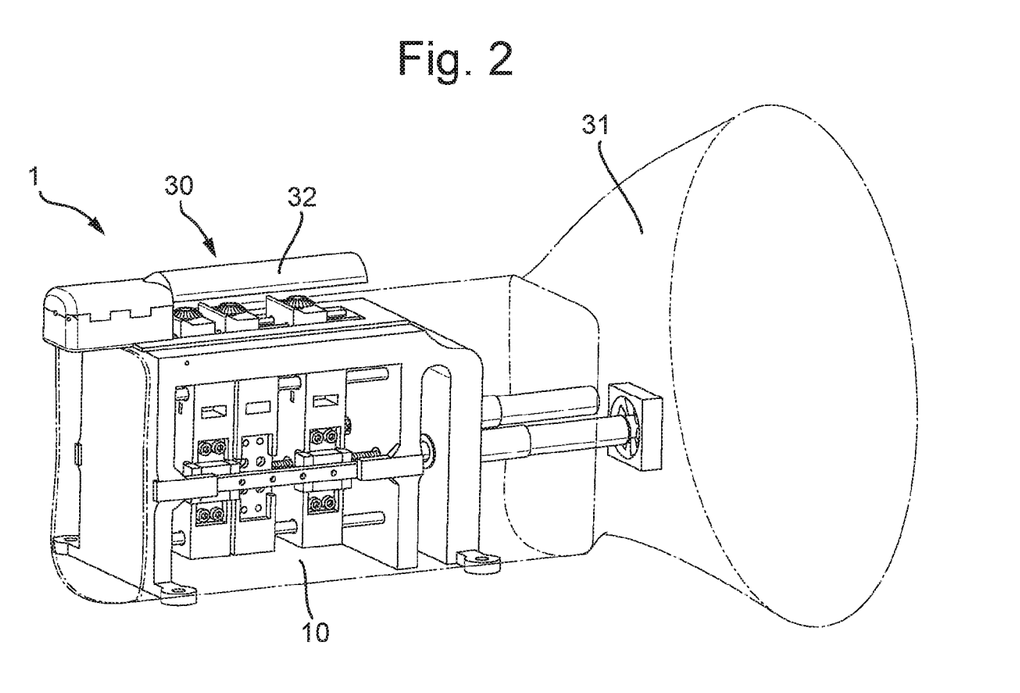
FIG. 2 schematically shows a different view of the actuation system shown in FIG. 1.

FIG. 2 is a schematic view of the actuation system 1 shown in FIG. 1. In the view shown in FIG. 2, the tool 20 is removed. As shown in FIG. 2, the plate interface 30 may be mounted on the actuation unit 10. As shown in FIG. 2, the drape sleeve 31 is sandwiched between the plate interface 30 and the actuation unit 10 when the plate interface 30 is attached to the actuation unit 10. Of course, when the plate interface 30 is detached from the actuation unit 10, the drape sleeve 31 is no longer sandwiched. Optionally, the drape sleeve 31 is directly attached to the plate interface 30 even when the plate interface 30 is not attached to the actuation unit 10. The drape sleeve 31 may comprise a window corresponding to the shape of the plate interface 30 so as to allow the plate interface 30 to be attached to the actuation unit 10 without interference from the drape sleeve 31.

A method of using the actuation system 1 in a surgical application is described below. Optionally, a kit of parts is provided. The kit of parts comprises the actuation unit 10, the plate interface 30 and the drape sleeve 31. The plate interface 30 may be packaged in sterile packaging so as to keep it sterile from the actuation unit 10. The parts may be covered by a dust cover, for example.

First, the dust cover may be removed from the kit of parts. The plate interface 30 may then be removed from its sterile packaging. The drape sleeve 31 may be already attached to the plate interface 30. Alternatively, the drape sleeve 31 may be provided separately from the plate interface 30. The actuation unit 10 is inserted into the drape sleeve 31. The plate interface 30 is attached to the actuation unit 10. Optionally, the actuation unit 10 comprises an insertion slot configured to securely receive the plate interface 30 in a fixed position. FIG. 2 shows the actuation system 1 after the plate interface 30 has been attached to the actuation unit 10, with the drape sleeve 31 sandwiched therebetween.

The plate interface 30 may be locked into position on the actuation unit 10. Optionally, the plate interface 30 is locked into position relative to the actuation unit 10 by locking means. Optionally the locking means comprises one or more mechanical clips. The clips may lock the plate interface 30 relative to the actuation unit 10 when pressure is applied pressing them together.

Figure 3:
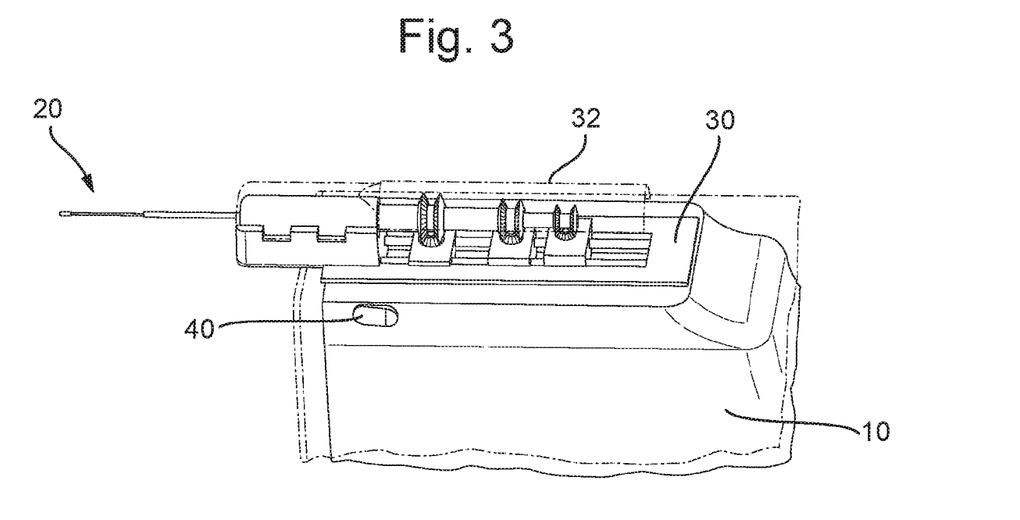
FIG. 3 is a close-up view of an unlocking button of an actuation system according to an embodiment of the invention.

As shown in FIG. 3, optionally the actuation unit 10 comprises an unlocking button 40. The unlocking button 40 is configured to unlock the plate interface 30 from the actuation unit 10 when the unlocking button 40 is pressed. In an alternative embodiment, the unlocking button 40 is provided to the plate interface 30 (rather than to the actuation unit 10). As a further alternative, an unlocking button 40 may be provided on each of the plate interface 30 and the actuation unit 10. Other members such as a slider or a knob may be used as alternatives to a button for unlocking the plate interface 30 from the actuation unit 10. Optionally, an electric switch such as an electromagnet may be provided for controlling attachment between the plate interface 30 and the actuation unit 10.

When the plate interface 30 is properly attached to the actuation unit 10, rotational and translational movement can be applied to any tool 20 that may be mounted onto the plate interface 30 and the actuation mechanisms 11, 12 of the actuation unit 10. This will be described in further detail below, with reference to FIGS. 4-6, for example.

Figure 7:
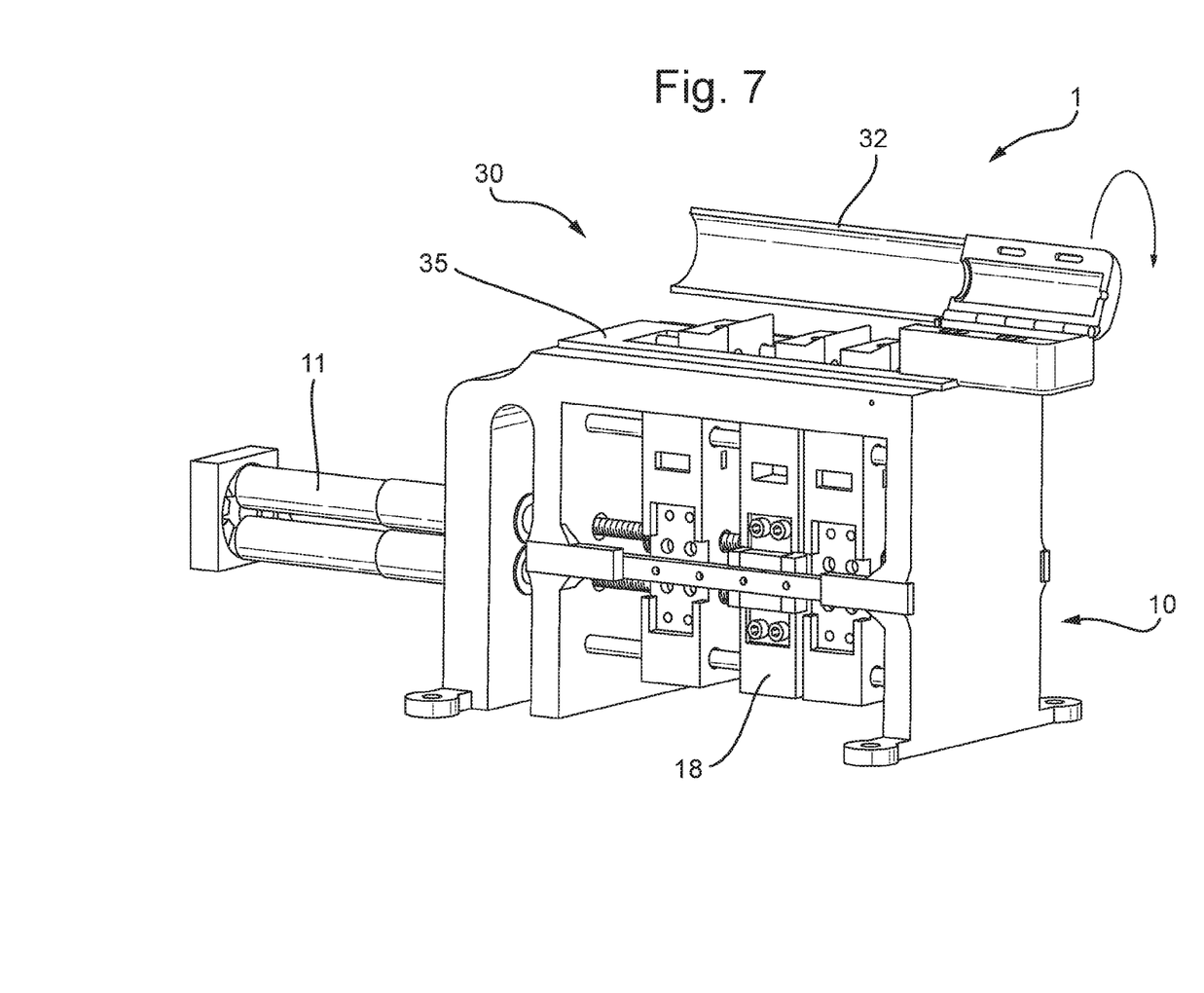
FIGS. 7 to 9 show loading of a tool into an actuation system according to an embodiment of the invention.
Figure 8:
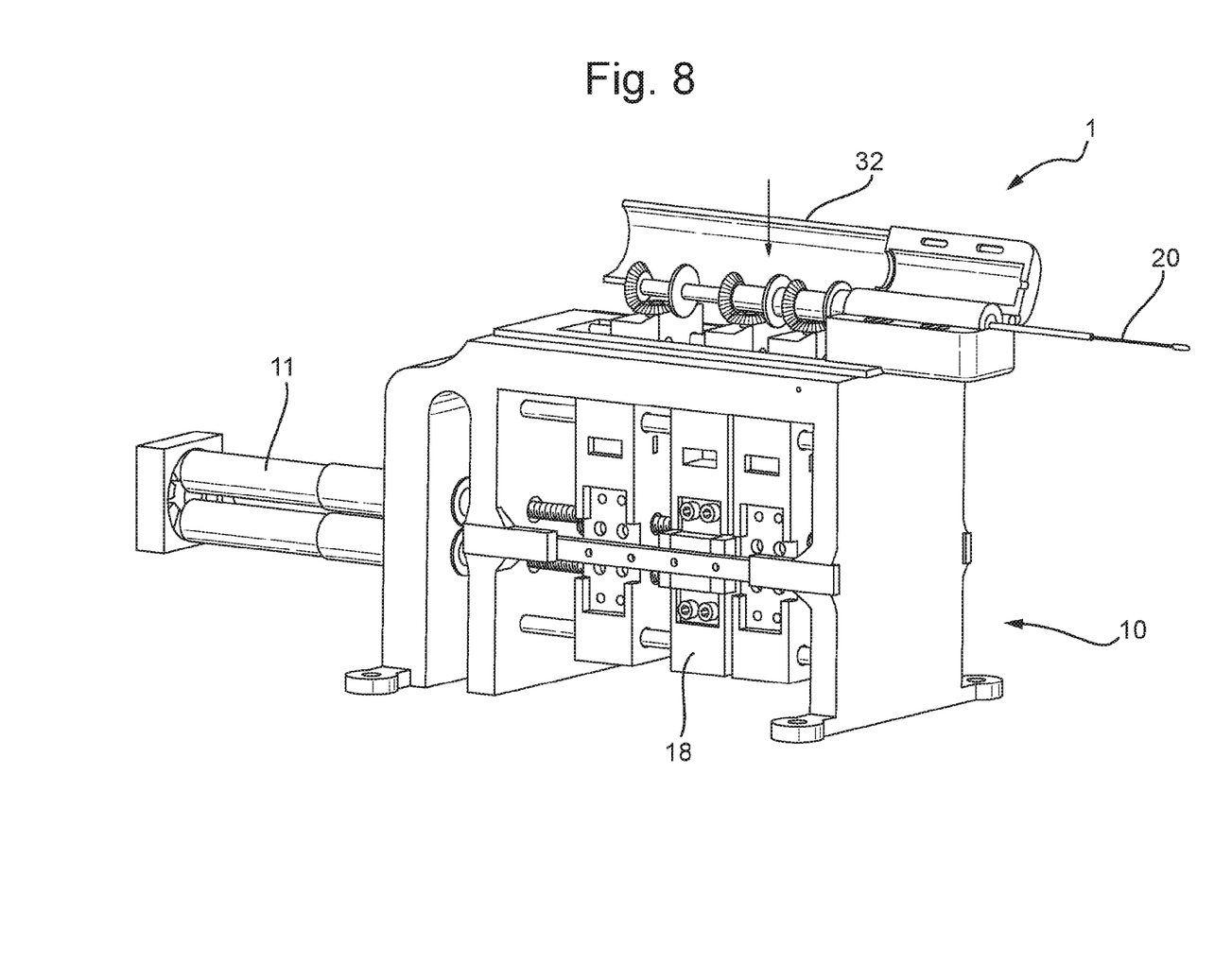
Figure 9:
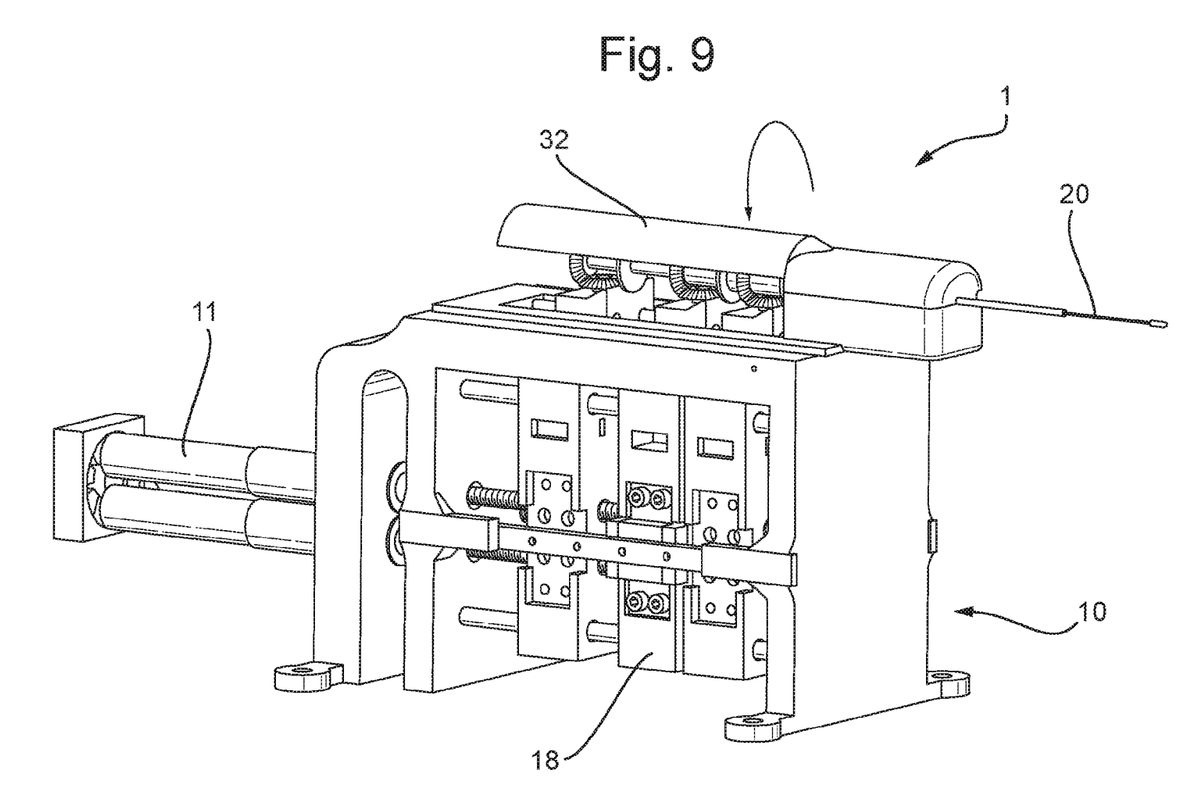

FIGS. 7-9 show different stages of a tool 20 being mounted onto the actuation system 1. As shown in FIG. 7, optionally the actuation system 1 comprises a tool cover 32. For example, the tool cover 32 may be part of the plate interface 30. Alternatively, the tool cover 32 may be a separate component from the plate interface 30. Optionally, the tool cover 32 is configured to press the concentric tubes 21 into engagement with couplings 50 that impart motion to the tubes 21. Of course, the tool cover 32 only presses the concentric tubes 21 when the concentric tubes 21 are supported by the plate interface 30.

As shown in FIG. 7, optionally the tool cover 32 can be opened and closed. FIG. 7 shows the tool cover 32 in an open configuration. The curved arrow in the top right corner of FIG. 7 represents the movement of the tool cover 32 when it opens. This allows access for the tool 20 to be loaded. As shown in FIG. 8, the tool 20, which may be a sterile surgical instrument, is inserted onto the plate interface 30. The downwards arrow at the top of FIG. 8 shows the movement of the tool 20 on to the actuation system 1. Alternatively, the tool cover 32 may be fixed in the closed position. The tool 20 may be slid in via the back of the plate interface 30 (by moving the tool 20 axially forwards).

As shown in FIG. 9, the tool cover 32 may then be closed. The curved arrow at the top of FIG. 9 shows the movement of the tool cover 32 as it is closed. Optionally the tool cover 32 is locked into position. This can be done by, for example, a magnetic coupling and/or by mechanical locks. The tool cover 32 keeps the concentric tubes 21 of the tool 20 in engagement with the actuation means.

The tool 20 can be removed by unlocking and opening the tool cover 32 and removing the tool 20. The tool 20 can be exchanged with another tool that corresponds to a different instrument. Alternatively, the tool 20 can be kept in position and only the tip 22 and/or end effector 23 of the tool 20 may be replaced.

At the end of the surgical operation, the tool 20 is removed from the actuation system 1. The plate interface 30 may then be detached from the actuation unit 10. The drape sleeve 31 is then removed from the actuation unit 10. In preparation for a subsequent surgical operation, the actuation unit 10 may be wiped clean and left to dry. Typically, the actuation unit 10 is not sterilised. In contrast, the plate interface 30 is sterilised before the next surgical operation. The actuation unit 10 can then be again covered by the dust cover.

Figure 16:
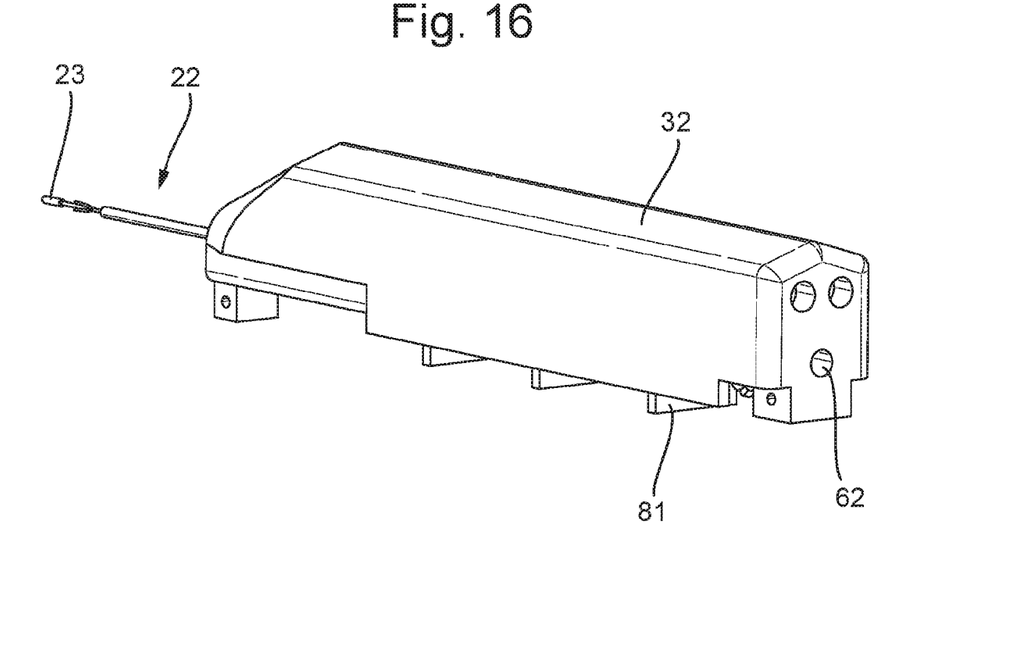
FIG. 16 schematically shows a tool cover according to an alternative embodiment of the invention.

FIG. 16 schematically shows an alternative embodiment of a tool cover 32. In the embodiment shown in FIG. 16, the tool cover 32 is a separate component from the plate interface 30 and is configured to attach the plate interface 30. Optionally, the tool cover 32 is fixed and does not open. The tool cover 32 forms a casing for containing parts of the tool 20. The tool cover 32 may be configured to guide the couplings 50, rather than press down the tool 20 onto the couplings 50. Optionally, the tool cover 32 comprises a hole 62 in fluid communication with the interior 61 of the tubes 21 of the tool 20. The hole 62 may be configured for connecting to a surgical tube 60 for suction and/or irrigation.

Figure 10:
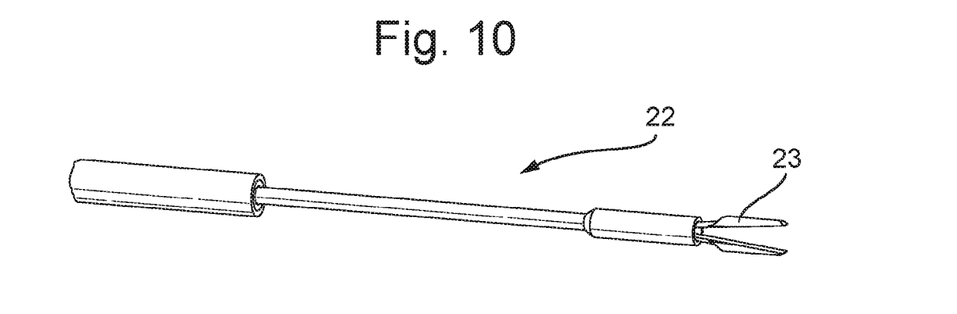
FIG. 10 schematically shows a tip of a tool according to an embodiment of the invention.

FIG. 10 is a schematic view of a tip 22 of the tool 20. As shown in FIG. 10, the tip 22 comprises an end effector 23. The end effector 23 may come in different shapes and functions. For example, as shown in FIG. 10, optionally the end of effector 23 is a grasper. Alternative end effectors include scissors, a needle and a suction tube.

Figure 4:
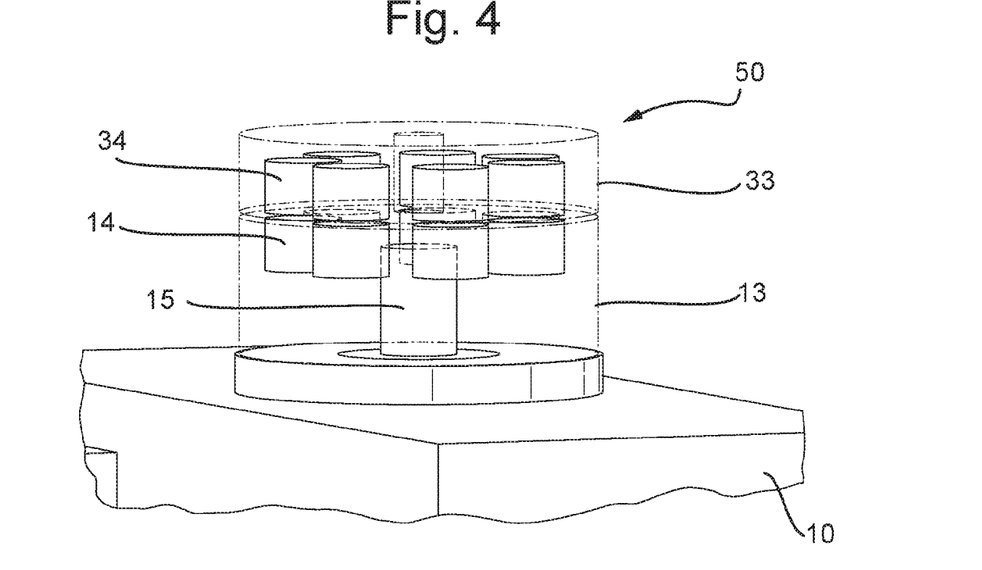
FIG. 4 is a close-up view of a coupling of an actuation system according to an embodiment of the invention.
Figure 6:
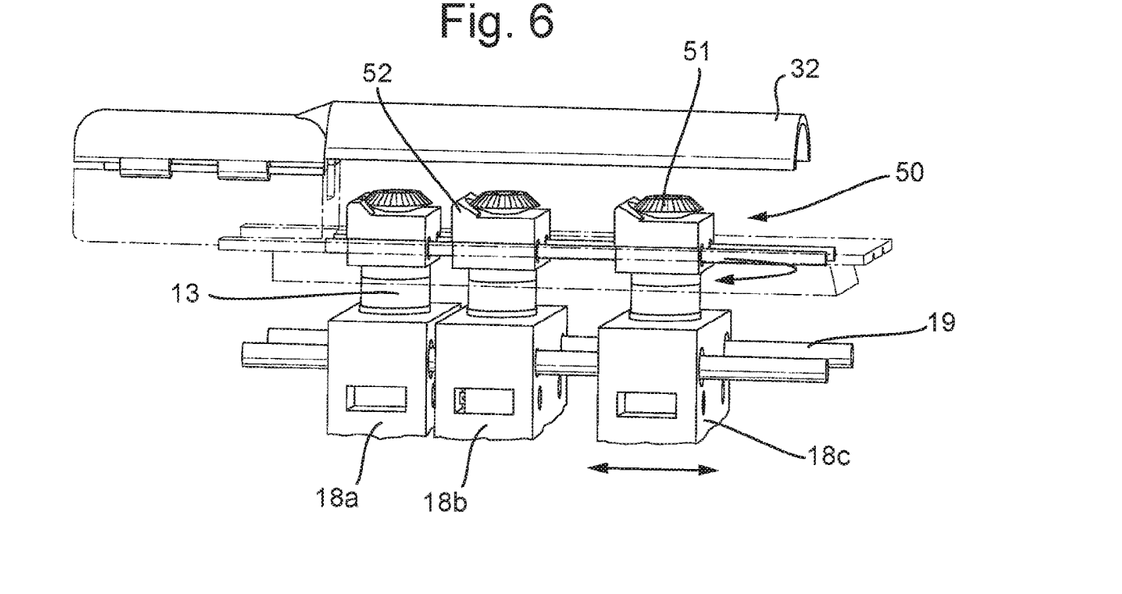
FIG. 6 is a close-up view of the couplings of an actuation system according to an embodiment of the invention.

As shown in close-up in FIG. 4, optionally the actuation system 1 comprises a plurality of couplings 50. The couplings 50 are for imparting motion to corresponding tubes 21 of the concentric tubes. Each coupling 50 is configured to move translationally along a first axis and to provide rotation about a second axis different from the first axis. FIG. 4 is a close-up view of one such coupling 50. FIGS. 5 and 6 show three couplings 50, one for each tube 21. In the example shown in FIGS. 4-6, the second axis (i.e. the axis of rotation) is orthogonal to the first axis (i.e. the axis of translational movement).

By providing that the axes for rotation and translational movement are different from each other, the rotational movement can be actuated from a position radially beside the concentric tubes 21. This allows greater access to the tool 20 within the sterile environment. Additionally, by providing that the two axes are different from each other, different types of tool 20 can be actuated using the same actuation system 1. This is explained in further detail below.

Figure 11:
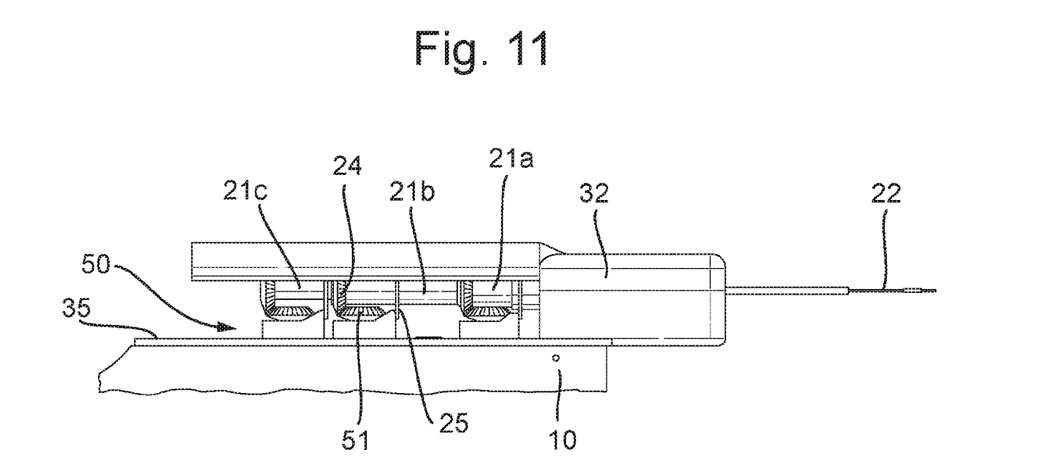
FIG. 11 schematically shows a tool comprising concentric tubes of a CTR loaded onto an actuation system according to an embodiment of the invention.
Figure 12:
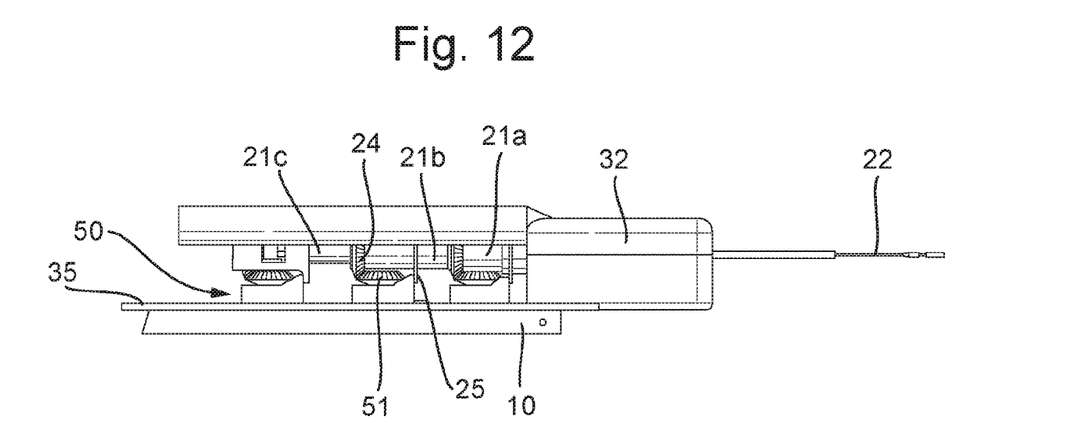
FIG. 12 schematically shows a hybrid tool loaded onto an actuation system according to an embodiment of the invention.

As mentioned above, different types of end effector 23 can be employed. Some end effectors have moving elements. The moving elements can be actuated through the means of the concentric tubes 21 and/or tendons 27. FIG. 11 schematically shows a tool comprising a tip 22 attached to the actuation unit 10. The tip 22 is controlled by the rotation and translational movement of the concentric tubes 21. FIG. 12 shows an alternative tool attached to the actuation unit 10. The tool shown in FIG. 12 comprises tubes 21 of a hybrid of a CTR and a tendon-driven robot in which the tip 22 is controlled by rotation and translation movement of the concentric tubes 21 and also by tendons 27. The tendons 27 can be seen more clearly in the close-up view of the hybrid tool shown in FIG. 13. As a further alternative not shown in the Figures, the tool may comprise tubes 21 of a tendon-driven robot (rather than a CTR or a hybrid robot).

As shown in FIG. 4, optionally each coupling 50 comprises an actuation side coupling part 13. The actuation side coupling part 13 is part of the actuation unit 10. The coupling 50 further comprises a tool side coupling part 33. The tool side coupling part 33 is part of the plate interface 30. As shown in FIG. 4, the actuation side coupling part 13 and the tool side coupling part 33 are configured to engage with each other when the plate interface 30 is attached to the actuation unit 10. This allows the translational and rotational movements of the coupling to be imparted to the tool side coupling part 33 by the actuation side coupling part 13.

The coupling 50 is configured such that the plate interface 30 can be detachably attached to the actuation unit 10. When the plate interface 30 is attached to the actuation unit 10, drive from the actuation unit 10 is transmitted to the tool 20 mounted on the plate interface 30. As shown in FIG. 4, optionally the actuation side coupling part 13 and the tool side coupling part 33 are configured to engage with each other by magnetic attraction and/or by mechanical means. The actuation side coupling part 13 may comprise a plurality of magnets 14. The tool side coupling part 33 may comprise a corresponding plurality of magnets 34. The magnets 14, 34 are configured to engage with each other in pairs so as to transmit the drive. As shown in FIG. 4, optionally the coupling 50 comprises a shaft 15 configured to transmit the rotational motion to the tool 20. The shaft 15 is attached to a rotation motor of the rotation mechanism 12 of the actuation unit 10 (shown in FIG. 5).

As shown in FIGS. 4-6, the tool side coupling parts 33 match the actuation side coupling parts 13. The couplings 50 are configured to transmit a rotational motion and a translational movement that lie on different axes. Although magnets are shown in FIG. 4, different means may be used. For example, one or more mechanical members may be used to engage the actuation side coupling part 13 with the tool side coupling part 33. Optionally, the coupling 50 comprises means for self-aligning tool side coupling parts 33 of the plate interface 30 onto the actuation side coupling parts 13.

As shown in FIG. 5, optionally the translational movement is generated with a linear actuator. For example, as shown in FIG. 5 the actuation unit 10 optionally comprises a translation mechanism 11 comprising a motor connected to a ball screw 16. However, other types of actuation may be used to generate the translational movement. For example, a hydraulic actuator could be used. Hydraulic actuators may be particularly desirable if the actuation system 1 is required to be compatible with MRI.

As shown in FIG. 5, optionally a translation mechanism 11 comprising a motor and ball screw 16 is provided for each of the concentric tubes 21 of the tool 20. As shown in FIG. 5, optionally the actuation system 1 comprises a plurality of translation carts 18. The translation carts 18 are configured to move translationally along the first axis. The translation carts 18 are configured to impart the translational movement to a corresponding coupling 50 and in turn to a corresponding tube 21.

As shown in FIG. 5, optionally each translation cart 18 comprises a rotation motor of the rotation mechanism 12. The rotation motor may be embedded in the translation cart 18. The rotation mechanism 12 comprising the rotation motor is configured to generate the rotation about the second axis which is imparted to the corresponding coupling 50. As shown in FIG. 4, the actuation side coupling part 13 is attached to the translation cart 18 in a way that allows the actuation side coupling part 13 to rotate relative to the translation cart 18.

As shown in FIG. 5, optionally each ball screw 16 is fixedly connected to a corresponding translation cart 18 via a ball screw nut 17. The ball screws 16 otherwise pass through or around the other translation carts 18 without affecting them. As shown in FIG. 5, optionally the actuation unit 10 comprises one or more rails 19. The rails 19 are configured to allow for stable translational movement of the translation carts 18 along the first axis. In the example shown in FIGS. 4-6, the first axis is horizontal and the second axis is vertical.

As shown in FIG. 6, optionally each coupling 50 comprises a bevel gear 51. The bevel gear 51 is configured to engage with a corresponding bevel gear 24 (e.g. see FIG. 13) of the corresponding tube 21 so as to impart rotational motion to the tube 21. The bevel gear 51 allows the axis of rotation to be changed when transferring the rotational movement from the rotation motor of the rotation mechanism 12 to the concentric tubes 21. In the arrangement shown in FIG. 13, the bevel gears 51, 24 are arranged such that the axis of rotation changes by 90°. However, alternative bevel gears may be used to provide different angles between the two rotational axes. It is not essential for the gear 24 to be a bevel gear, particularly when the gear 24 is configured to control tendons 27 (described below).

The curved arrow in the right-hand side of FIG. 6 shows the rotation of the bevel gear 51 around the rotational axis of the corresponding rotation motor (of the rotation mechanism 12) embedded in the translation cart 18. The horizontal arrow at the bottom of FIG. 6 indicates the movement of the translation carts 18 along the rails 19.

Figure 13:
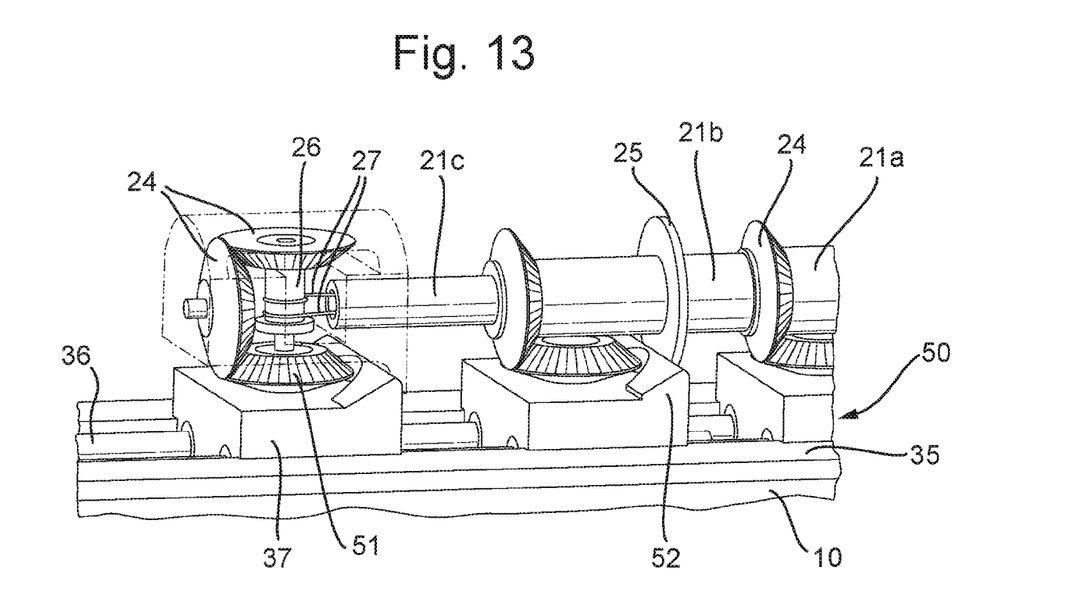
FIG. 13 is a close-up view of part of the hybrid tool loaded on to the actuation system.

As can be seen most clearly in FIG. 13, optionally the tool comprises tubes 21 of a hybrid tool. As shown in FIG. 13, optionally at least one of the tubes 21 comprises a bevel gear 24 around its circumference. For example, in the arrangement shown in FIG. 13, each of the tubes 21a, 21b has a bevel gear 24 around its circumference.

As explained above, the bevel gear 24 allows the corresponding tube 21 to receive a rotational movement from a corresponding rotation motor that has a different axis of rotation. As can be seen from FIG. 13, optionally the bevel gear 24 of the concentric tube 21 is configured to receive a translational force to cause translation movement of the corresponding tube 21 in one direction. For example, in the arrangement shown in FIG. 13, each bevel gear 24 receives a force to cause the corresponding tube 21 to move translationally towards the left (in the orientation shown in FIG. 13). This is because the bevel gear 24 of the tube 21 and the bevel gear 51 of the coupling 50 overlap each other when viewed along the axis of the tube 21. When the coupling 50 is caused to move translationally by the translation mechanism 11 of the actuation unit 10, the bevel gear 51 of the coupling 50 abuts and pushes the bevel gear 24 of the corresponding tube 21. This causes the tube 21 to move proximally (i.e. in the direction away from the end effector 23 of the tip 22). Optionally, the bevel gear 24 of the tube 21 has a dual purpose of receiving translational movement and rotational movement for the corresponding tube 21.

As shown in FIG. 13, optionally the tube 21 of the tool 20 comprises a flange 25 around its circumference. The flange 25 is spaced axially from the bevel gear 24. The flange 25 is configured to receive a force that results in translational movement of the tube 21. For example, in the arrangement shown in FIG. 13, when the coupling 50 moves towards the right, the coupling 50 abuts against the flange 25. This causes the corresponding tube 21 to move translationally towards the right (in the orientation shown in FIG. 13).

As shown in FIG. 13, optionally the coupling 50 comprises a flange 52. The flange 52 of the coupling 50 is configured to engage with the corresponding flange 25 of the corresponding tube 21 so as to impart translational motion to the tube 21 in at least one direction. The engagement between the bevel gears 51, 24 imparts translational movement to the tube 21 in the opposite direction.

Figure 17:
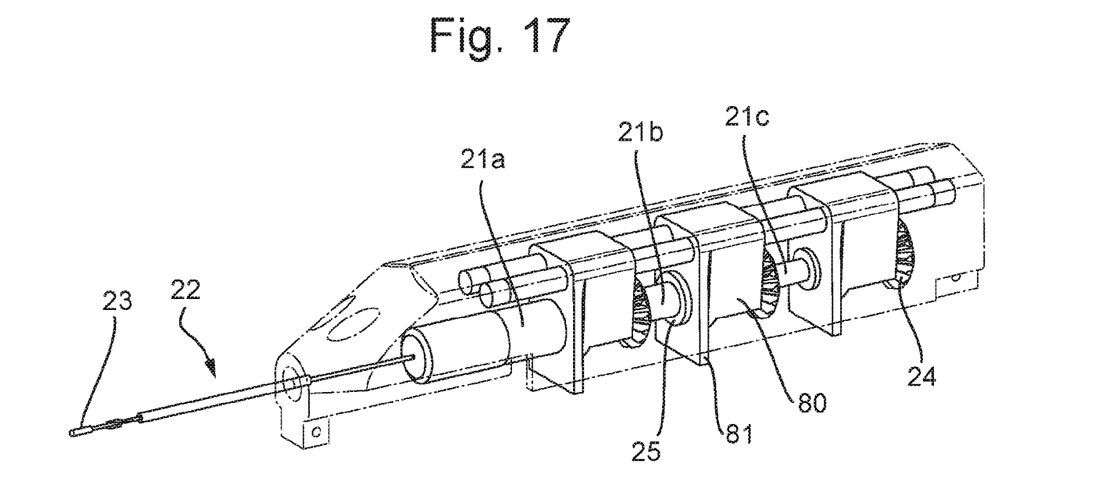
FIG. 17 schematically shows the interior of the apparatus shown in FIG. 16.

FIG. 17 schematically shows an alternative arrangement that functions similarly to the arrangement shown in FIG. 13. Differences are described below. As shown in FIG. 17, optionally the tool comprises a carriage 80 corresponding to each tube 21. The carriages 80 carry respective tubes 21. Each carriage 80 comprises a flange 81 configured to engage with the bevel gear 51 or flange 52 of the coupling 50. Optionally, the couplings 50 do not have flanges 52 and the flange 81 of the carriage 80 contacts the bevel gear 51 of the coupling 50 directly. Optionally, the tubes 21 comprise a flange 25 or a change in diameter (e.g. see the outer tube 21a) configured to prevent linear motion of the tube 21 with respect to the carriage 80.

In an alternative arrangement, the flange 25 of the tube 21 may fit within a groove of the coupling 50. When the coupling 50 moves in either direction translationally, the inner surfaces of the groove of the coupling push the flange 25 of the tube 21. This causes translational movement of the corresponding tube 21. The flange 25 may cause translational movement of the tube 21 in both directions translationally.

As shown in FIG. 5, optionally the actuation unit 10 comprises a plurality of translation carts 18. The translation carts 18 are configured to move translationally along the first axis and impart the translational movement to a corresponding coupling 50. Each translation cart 18 comprises a rotation motor of a rotation mechanism 12. The rotation motor is configured to generate the rotation about the second axis which is imparted to the corresponding coupling 50. Optionally, one translation cart 18 is provided for each tube 21 of the tool 20. The number of tubes 21 is not particularly limited. The number of tubes 21 may be selected depending on the number of degrees of freedom required for the end effector 23 of the tool 20. In the arrangement shown in the Figures, a first translation cart 18a is configured to impart translational and rotational movement to the outer tube 21a, a second translation cart 18b is configured to impart translational and rotational movement to the intermediate tube 21b, and a third translation cart 18c is configured to impart translational and rotational movement to the inner tube 21c.

As seen most clearly in FIG. 13, optionally the tool 20 comprises a capstan 26 and at least one tendon 27 configured to be wound around the capstan 26 so as to actuate an end effector 23 of the tool 20. Rotation of the capstan 26 causes a tendon 27 to be in tension, thereby actuating the end effector 23. Optionally, a plurality of tendons 27 are provided. The tendons 27 may be attached to each other around the back of the capstan 26. Optionally, the capstan 26 is configured to be controllably rotated in either direction around the same axis so as to apply a tension to a selected one of two tendons 27. The tendons 27 allow a wider variety of end effectors 23 requiring independent actuation to be applied to the tool 20. Optionally, the tool 20 comprises at least one segment controlled by tendons 27. For example, tendons 27 can control bending of the tool 20 (e.g. left-right, or alternatively up-down) as well as the translation movement controlling advancement of the tip 22 forwards-backwards. Optionally, a capstan is not required. For example, optionally, the tendons 27 control movement of a component such as a rigid rod configured to straighten a flexible outer tube, thereby controlling movement of the tip 22. As another example, the tip 22 may be driven using a rigid link (or a rigid tendon 27).

As shown in FIG. 13, optionally the capstan 26 is fixedly attached to a bevel gear 24 configured to rotate about the same axis as the capstan 26. As shown in FIG. 13, optionally the rotational movement is transferred from the bevel gear 51 of the coupling 50 via two bevel gears 24. The two bevel gears 24 form part of the tool 20. The bevel gears 24 effectively reverse the direction of rotation from the rotation motor of the rotation mechanism 12 of the actuation unit 10 to the capstan 26. In an alternative embodiment, the capstan 26 may be fixedly attached to a gear that is complimentary to the bevel gear 51 of the coupling 50. This allows the rotation from the rotation motor to be transferred to the capstan 26 without changing the direction of rotation. This reduces the number of gears in the system by one.

As shown in FIG. 13, optionally the plate interface 30 comprises at least one rail 36. For example, two rails 36 may be provided. The rails 36 are for allowing stable translational movement of the couplings 50. As shown in FIGS. 11 and 12, for example, optionally the plate interface 30 comprises a plate section 35. The plate section 35 is substantially flat and provides a boundary between a non-sterile environment and a sterile environment.

Figure 14:
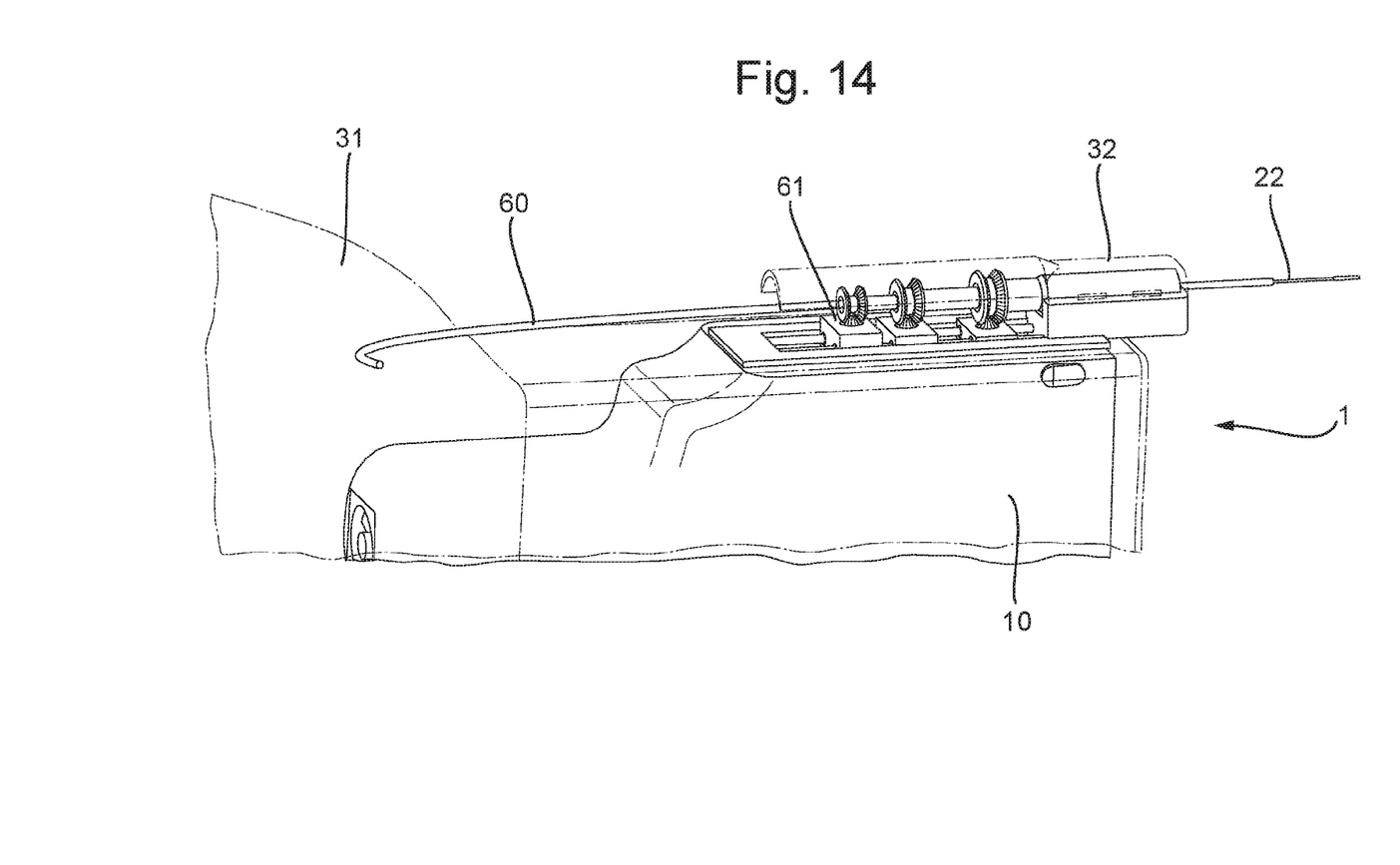
FIG. 14 schematically shows access to the interior of the tool loaded onto an actuation system according to an embodiment of the invention.

As shown in FIG. 14, optionally a surgical tube 60 extends through the tubes 21 of the tool 20. The surgical tube 60 may be for applying suction to the interior 61 of the tubes 21. Alternatively, the surgical tube 60 may be for injecting one or more substances to the interior 61 of the tubes 21. Optionally, the surgical tube 60 is for irrigating the interior 61 of the tubes 21. The surgical tube 60 has sterile access to the interior 61 of the tubes 21. This is because the region directly behind the tubes 21 is kept away from the actuation unit 10.

Figure 15:
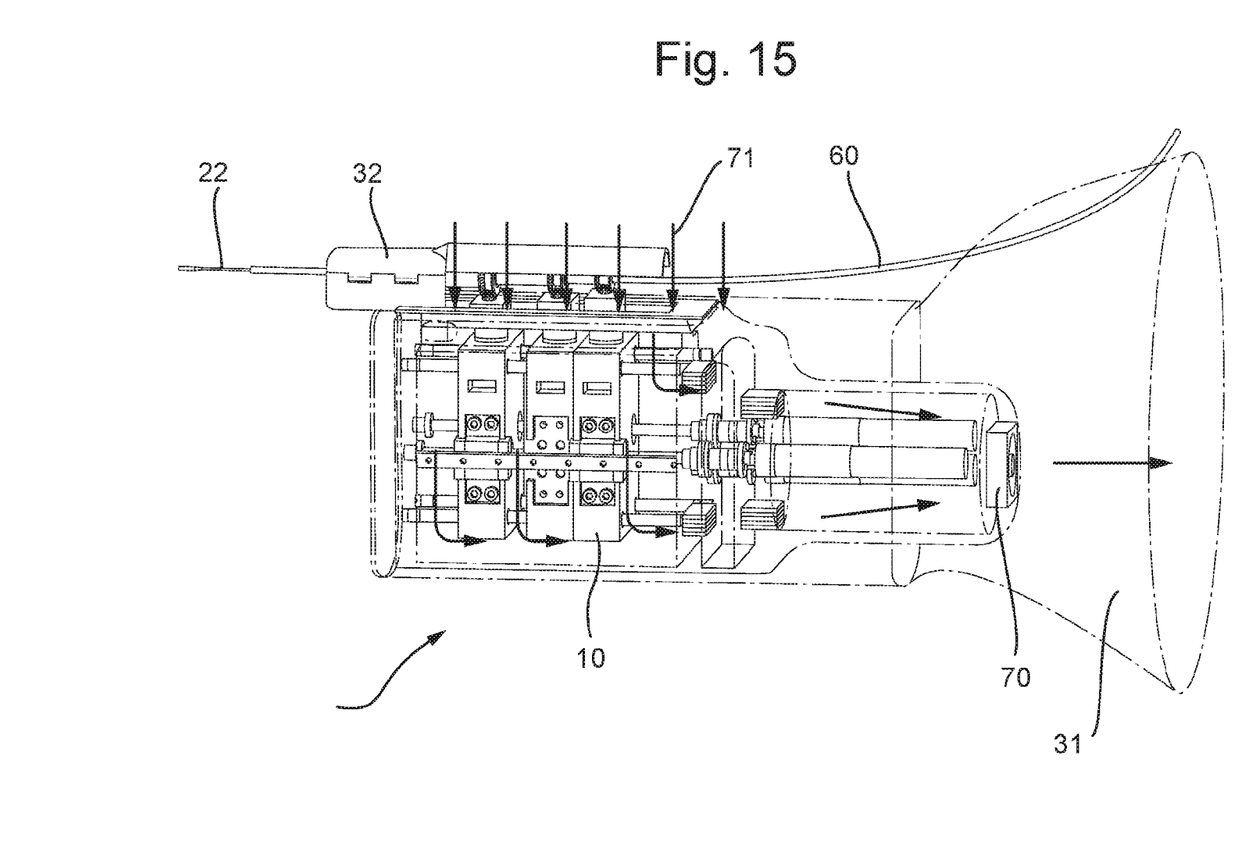
FIG. 15 schematically shows airflow through the actuation system according to an embodiment of the invention.

As shown in FIG. 15, optionally the actuation unit 10 comprises a fan 70. The fan 70 is configured to cause gas 71 to flow through the plate interface 30 into the actuation unit 10. In FIG. 15 the arrows inside the actuation unit 10 represent the flow of the gas through the actuation unit 10. The flow of the gas is promoted by the fan 70. The fan 70 produces the gas pressure below the plate interface 30 to be lower than the gas pressure above the plate interface 30. The fan 70 produces negative air pressure below the plate interface 30 relative to the ambient pressure. Alternatively, flow may be driven by higher pressure being generated locally above the tool 20. The arrow on the right-hand side of FIG. 15 represents the flow of the gas out through the actuation unit 10. Optionally, the actuation unit 10 has a constant suction airflow. The airflow can cool down the motors of the actuation mechanisms 11, 12 of the actuation unit 10. The airflow can cool down the electronics of the actuation unit 10. The flow of gas 71 is directed from the instrument area towards the actuation unit 10 so that no dirty air is pushed from the inside of the actuation unit 10 to the sterile environment. This helps to maintain the sterile environment.

As mentioned above, optionally the actuation system 1 is used to control the end effector 23 of a tool 20. Alternatively, the actuation system 1 may be used for controlling a catheter. The actuation system 1 may be used for fine motor control. A different system may be used for initially performing coarse movements of the tool 20 or catheter.

The range of movement of each tube 21 may be limited by the size of the hole (and length of the rails 36) in the plate section 35 of the plate interface 30. The plate interface 30 can be designed to provide the required range of movement. Merely as an example, the range of movement of each tube 21 may be in the range of from about 10 mm to about 50 mm, for example about 30 mm.

The underside of the plate section 35 may be no longer sterile when the plate interface 30 is attached to the actuation unit 10. The topside of the plate section 35 may remain sufficiently sterile to maintain the sterility of the surgical environment.

When the plate interface 30 is attached to the actuation unit 10, the two halves of the couplings 50 are aligned to each other so as to form the couplings 50. Optionally, the actuation unit 10 is provided such that each translation cart 18 has a corresponding home position. This makes it easier to align the two halves of the couplings 50 when the plate interface 30 is attached to the actuation unit 10. Optionally, each tool side coupling part 34 of the coupling 50 has a corresponding home position in the plate interface 30 before the plate interface 30 is attached to the actuation unit 10. For example, weak magnets may be applied to the underside of the cover 32 and to the top of the block that holds the bevel gear 51 so as to define the home positions.

Exemplary embodiments of the invention have been described above. Modifications can be made to the specific examples described above and shown in the drawings. For example, the invention can be implemented with a tendon-driven robot in place of the CTR or the hybrid robot described above. The scope of the invention is defined in the claims.

The invention claimed is:
1. An actuation system for actuating at least one tube of a concentric-tube robot, a tendon-driven robot or a hybrid of a concentric-tube robot and a tendon-driven robot,
   wherein the actuation system is configured to actuate the at least one tube from radially to one side of the at least one tube,
   wherein the actuation system further comprises at least one coupling for imparting motion to a corresponding tube of the at least one tube, each coupling configured to move translationally along a first axis and to rotate about a second axis different from the first axis,
   wherein the actuation system further comprises an actuation unit comprising motors and a plate interface for supporting the at least one tube such that the at least one tube can be removed from and replaced on the plate interface,
   wherein the plate interface is attachable to and detachable from the actuation unit,
   wherein each coupling comprises an actuation side coupling part that is part of the actuation unit and a tool side coupling part that is part of the plate interface, and
   wherein the actuation side coupling part and the tool side coupling part are configured to engage with each other when the plate interface is attached to the actuation unit so that the translational and rotational movement of the coupling is imparted to the tool side coupling part by the actuation side coupling part.

2. The actuation system of claim 1, wherein the second axis is orthogonal to the first axis.

3. The actuation system of claim 1, comprising a tool cover configured to guide the at least one coupling when the at least one tube is supported by the plate interface.

4. The actuation system of claim 1, wherein the actuation side coupling part and the tool side coupling part are configured to engage with each other by magnetic attraction.

5. The actuation system of claim 1, wherein the actuation side coupling part and the tool side coupling part are configured to engage with each other by a mechanical member.

6. The actuation system of claim 1, wherein each coupling comprises a bevel gear configured to engage with a corresponding gear of the corresponding tube so as to impart rotational motion to the tube.

7. The actuation system of claim 6, wherein each tube is carried by a respective carriage that comprises a flange configured to engage with the corresponding coupling such that translational motion is imparted to the tube in one direction, the engagement between the gears imparting translational motion to the tube in the opposite direction.

8. The actuation system of any of claim 1, wherein the actuation unit comprises a fan configured to cause gas to flow through the plate interface into the actuation unit.

9. The actuation system of any of claim 1, comprising a drape sleeve in which the actuation unit can be inserted.

10. The actuation unit of claim 9, wherein the drape sleeve is attached to the plate interface.

11. The actuation unit of claim 9, wherein the drape sleeve is sandwiched between the plate interface and the actuation unit when the plate interface is attached to the actuation unit.

12. An actuation system for actuating at least one tube of a concentric-tube robot, a tendon-driven robot or a hybrid of a concentric-tube robot and a tendon-driven robot,
wherein the actuation system is configured to actuate the at least one tube from radially to one side of the at least one tube,
wherein the actuation system further comprises at least one coupling at least one coupling for imparting motion to a corresponding tube of the at least one tube, each coupling configured to move translationally along a first axis and to rotate about a second axis different from the first axis, and
wherein the actuation system further comprises at least one translation cart configured to move translationally along the first axis and impart the translational movement to a corresponding coupling, wherein each translation cart comprises a motor configured to generate the rotation about the second axis which is imparted to the corresponding coupling.

13. An actuation system for actuating at least one tube of a concentric-tube robot, a tendon-driven robot or a hybrid of a concentric-tube robot and a tendon-driven robot,
wherein the actuation system is configured to actuate the at least one tube from radially to one side of the at least one tube,
wherein the actuation system further comprises an actuation unit comprising motors and a plate interface for supporting the at least one tube such that the at least one tube can be removed from and replaced on the plate interface, and
wherein the plate interface is attachable to and detachable from the actuation unit.

* * * * *